United States Patent
Tavana et al.

(10) Patent No.: US 7,058,020 B2
(45) Date of Patent: Jun. 6, 2006

(54) HARDWARE TIME STAMPING AND REGISTRATION OF PACKETIZED DATA METHOD AND SYSTEM

(75) Inventors: Sadredin Tavana, Sudbury, MA (US); Laco Scott Harvell, Brookline, NH (US); Kaynam Hedayat, Chestnut Hill, MA (US); Steven A. DesRochers, Londonderry, NH (US)

(73) Assignee: Brix Networks, Inc., Chelmsford, MA (US)

( * ) Notice: Subject to any disclaimer, the term of this patent is extended or adjusted under 35 U.S.C. 154(b) by 668 days.

(21) Appl. No.: 09/860,295

(22) Filed: May 18, 2001

(65) Prior Publication Data

US 2002/0024973 A1  Feb. 28, 2002

Related U.S. Application Data

(60) Provisional application No. 60/264,462, filed on Jan. 26, 2001, provisional application No. 60/205,280, filed on May 18, 2000.

(51) Int. Cl.
  *G01R 31/08* (2006.01)
  *H04L 9/00* (2006.01)

(52) U.S. Cl. ..................... 370/252; 713/178
(58) Field of Classification Search ............... 713/178; 370/252, 253; 375/228
See application file for complete search history.

(56) References Cited

U.S. PATENT DOCUMENTS

| | | | |
|---|---|---|---|
| 4,380,029 A | 4/1983 | Bode | 360/48 |
| 5,309,428 A | 5/1994 | Copley et al. | 370/17 |
| 5,315,580 A * | 5/1994 | Phaal | 370/232 |
| 5,337,308 A | 8/1994 | Fan | 370/60 |
| 5,581,558 A * | 12/1996 | Horney et al. | 370/401 |
| 5,757,778 A * | 5/1998 | Kim et al. | 370/252 |
| 5,822,317 A | 10/1998 | Shibata | 370/474 |
| 5,923,902 A | 7/1999 | Inagaki | |
| 5,953,483 A | 9/1999 | Van Gestel | 386/65 |
| 5,966,387 A | 10/1999 | Cloutier | 370/516 |
| 6,006,270 A | 12/1999 | Kobunaya | |
| 6,021,449 A * | 2/2000 | Chow et al. | 710/57 |
| 6,104,729 A * | 8/2000 | Hellum et al. | 370/503 |
| 6,393,489 B1 * | 5/2002 | Sambamurthy et al. | 709/250 |
| 6,680,955 B1 * | 1/2004 | Le | 370/477 |
| 6,690,683 B1 * | 2/2004 | Brunheroto et al. | 370/542 |
| 6,782,035 B1 * | 8/2004 | Nakamura et al. | 375/130 |

OTHER PUBLICATIONS

Newton, Harry; Newton's Telecom Dictionary, Mar. 2004, CMP Books, 20th ed, p. 442.*

* cited by examiner

*Primary Examiner*—Huy D. Vu
*Assistant Examiner*—Cynthia L. Davis
(74) *Attorney, Agent, or Firm*—Mark G. Lappin; Greenberg Traurig LLP (57) ABSTRACT

A system for time-stamping a data packet associated with a data network allows software applications, running on non-deterministic systems, to determine the precise time that packets were transmitted to or received from a physical network interface. The system includes a network media interface device for transferring a data packet to or from a network medium, and a time source for generating and maintaining a time code. The system further includes a time-stamping circuit for sampling a time code from the time source when the interface device transfers the data packet to or from the network medium, and for associating the time code with the receive data packet so as to form a time-stamped packet.

28 Claims, 4 Drawing Sheets

HARDWARE TIME STAMPING AND REGISTRATION OF PACKETIZED DATA METHOD AND SYSTEM

CROSS-REFERENCE TO RELATED APPLICATIONS

This application is related to the following U.S. applications, of common assignee, from which priority is claimed, and the contents of which are incorporated herein in their entirety by reference:

"Method for Receive Hardware Time Stamping Packetized Data," U.S. Provisional Patent Application Ser. No. 60/264,462, filed Jan. 26, 2001; and, "System For And Method Of Measuring And Reporting Quality And Performance Metrics Associated With Network-Based Services," U.S. Provisional Patent Application Ser. No. 60/205,280, filed May 18, 2000.

This application is related to the following U.S. applications, of common assignee:

"IP Packet Identification Method and System for TCP Connection and UDP Stream," U.S. patent application Ser. No. 09/860,287.

"Non-Deterministic Software Delay Estimation Method And System For Packet Based Data Network Systems," U.S. patent application Ser. No. 09/860,296.

"Method And System For Transmit Time Stamp Insertion In A Hardware Time Stamp System For Packetized Data Networks," U.S. patent application Ser. No. 09/860,297.

STATEMENT REGARDING FEDERALLY SPONSORED RESEARCH

Not applicable

REFERENCE TO MICROFICHE APPENDIX

Not applicable

BACKGROUND OF THE INVENTION

The present invention relates to packetized data networks, and more particularly, to determining time-of-transmission and time-of-arrival of data packets on a data network.

Figure 1:
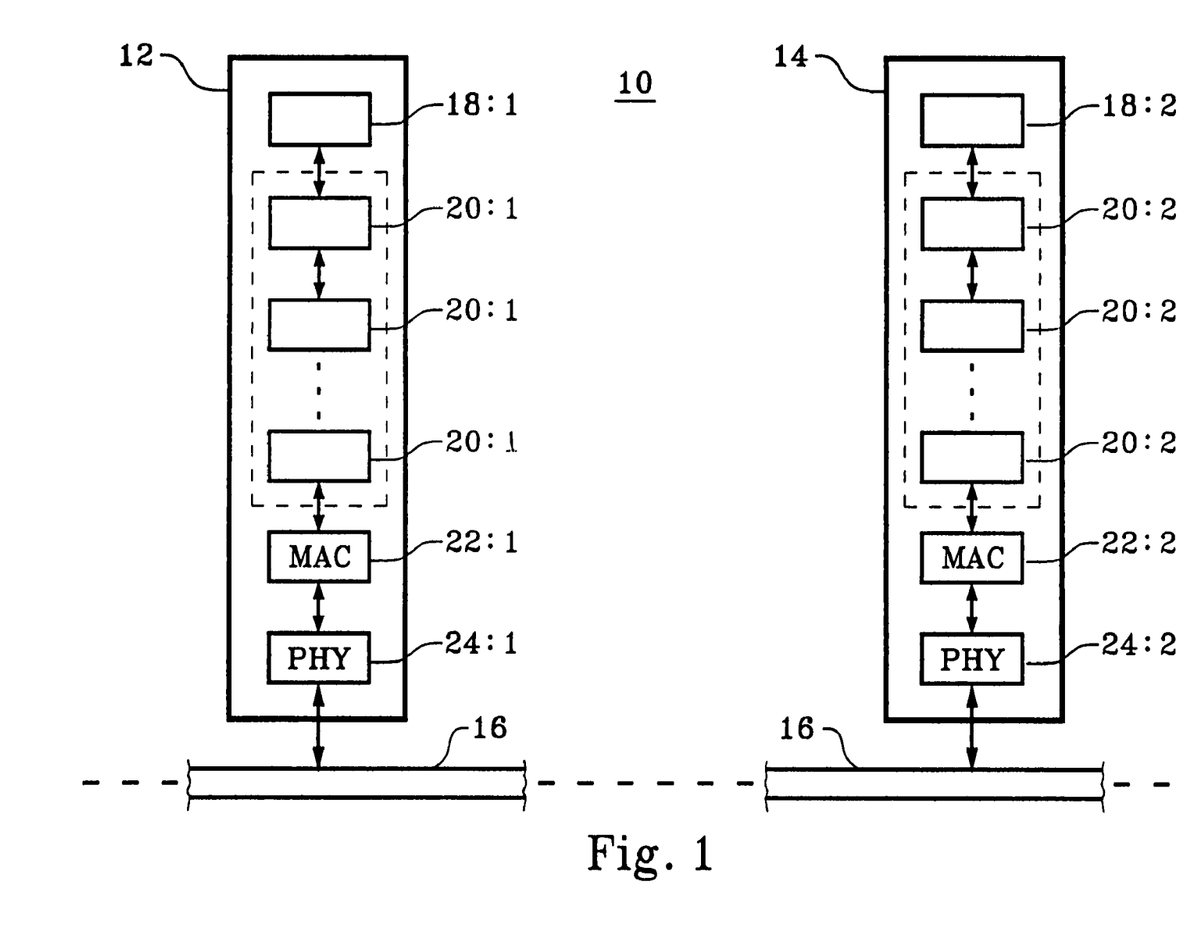
FIG. 1 illustrates how a prior art system uses a ping test to determine packet propagation delay.

In order to evaluate the functionality and efficiency of a packetized data network, network software applications often monitor many aspects of packet traffic on the network. For example, in order to determine packet propagation delay (also referred to herein as "transit delay," "transit time" or "propagation time") from one point on the network to another, a network software application can time-tag (also referred to herein as "time-stamp") individual packets as they are transmitted or received and use the time-stamp information to determine propagation time. As used herein, the term "time-tag" or "time-stamp" means to sample a chronometer (or other reference time code source) when the packet is at a particular location in the network, then associate the sampled time code with the packet. Some prior art systems time-stamp the packets that are used in a "ping test" to determine packet propagation delay on a network. A ping test uses echo request packets and echo response packets to create a loop-back test between two stations on a network. FIG. 1 illustrates how a prior art system 10 uses a ping test to determine packet propagation delay. The system 10 includes a first station 12 and a second station 14 that communicate via a network medium 16. Each station includes test application software 18, several layers of intermediate software 20, a medium access controller (MAC) 22, and a physical medium interface (PHY) 24 (e.g., an Ethernet interface). The test application software 18:1 in the first station 12 generates and time-stamps an echo request packet. The application software 18:1 immediately sends the packet through the layers of intermediate software 20:1 (also referred to herein as the "software stack"), the MAC 22:1 and the PHY 24:1, and out to the second station 14 via the network medium 16. When the echo request packet reaches the second station 14, the packet passes through the PHY 24:2, the MAC 22:2, the software stack 20:2, and is received by the application software 18:2. The application software 18:2 compiles an echo response packet and sends the response packet back through the stack 20:2, the MAC 22:2, the PHY 24:2 and out to the first station 12 via the network medium 16. When the echo response packet reaches the first station 12, the packet passes through the PHY 14:1, the MAC 22:1, the stack 20:1 and is received and time-tagged by the application software 18:1. The application software 18:1 calculates the difference between the time-tag of the received echo request packet and the time-tag of the transmitted echo response packet to determine the round-trip propagation delay of the packet.

One disadvantage of such prior art systems is that since the packet time-tagging occurs at the application software 18:1, the propagation times through the software stacks 20:1 and 20:2 are included in the round trip time that the application software 18:1 calculates. The propagation times through the software stacks 20:1 and 20:2 are subject to non-deterministic delays induced by operating systems and software processes. The delays are non-deterministic because the operating systems and software processes are typically multitasking, and thus dependent on instantaneous loading from various external factors. Further, the chronometer that a typical prior art system uses is often software-based, and therefore vulnerable to the same non-deterministic effects that influence the software stacks. Since the delays induced via such prior art time stamping schemes are non-deterministic, accurate arrival and network infrastructure transit times are not possible to predict. An accurate arrival time for packets is of particular interest in communications systems for applications that are delay-bounded, such as voice and video. This is especially true when the inaccuracy in marking transmit and arrival times is greater than the jitter and delay resolution required by real time application.

It is an object of the present invention to substantially overcome the above-identified disadvantages and drawbacks of the prior art.

SUMMARY OF THE INVENTION

The present invention allows software applications, running on non-deterministic systems, to determine the precise time that packets were transmitted to or received from a physical network interface. Such an algorithm is not application dependent, and the same scheme works regardless of the application layer protocol used for communication.

The present invention removes the delays induced by software time stamping schemes, which allows highly accurate measurements of network transit times for packetized data. The invention requires that a time value be associated to all packets that are received from the physical media. This operation is performed by hardware to minimize delays associated with packet reception functions. The time value that is associated with a packet can be correlated to either the first bit of the packet or alternatively the last bit of the packet received from the physical media. The time source can be a simple free running counter running from a relatively stable local oscillator, or a GPS based time source that is disciplined to UTC (Coordinated Universal Time).

Each packet that is received from the physical network will have a unique time stamp associated with it. A software process that has non-deterministic delays can process these hardware time stamped packets in the future on a non-real time basis without losing precise arrival time information, since each packet contains its own time stamp value.

The foregoing and other objects are achieved by the invention which in one aspect comprises a system for time-stamping a data packet associated with a data network. The system includes a network media interface device for transferring a data packet to or from a network medium, and a time source for generating and maintaining a time code. The system further includes a time-stamping circuit for sampling a time code from the time source when the interface device transfers the data packet to or from the network medium, and for associating the time code with the receive data packet so as to form a time-stamped packet.

In another embodiment of the invention, the time-stamping circuit further includes a memory circuit for storing the time-stamped packet.

In another embodiment of the invention, the network media interface device includes an Ethernet interface device for implementing an Ethernet protocol on the network media.

In another embodiment of the invention, the system further includes an application software package for receiving a pair of time-stamped packets from the time stamping-circuit. The software package calculates a time difference from the time-stamped packets. The time difference corresponds to the amount of time that elapsed on the time source between when the first packet was stamped and when the second packet was stamped.

In another embodiment of the invention, the application software package further includes a registration module for designating one or more specific packets. The software package receives the specific packet designations from the registration module, and processes only those specific packets of all the packets received from the time-stamping circuit.

In another embodiment of the invention, the application software package further includes a registration module for designating one or more specific packets. The time-stamping circuit receives the specific packet designations from the registration module, and time-stamps only those specific packets of all the data packets transferred to or from the network.

In another embodiment of the invention, each of the time-stamped packets includes at least a portion of the time code in a CRC field of the packet.

In another embodiment of the invention, for each of the time-stamped packets, the time-stamping circuit executes a CRC calculation on the packet so as to produce a single error bit signifying whether or not an error is present in the packet. The time-stamping circuit further removes an original CRC word from the CRC field of the packet. The time-stamping circuit also inserts the error bit and the time code into the CRC field of the packet.

In another embodiment of the invention, the time-stamping circuit passes each packet to the application software package via a media access controller.

In another embodiment of the invention, the time stamping circuit passes each packet to the application software package via a media access controller, and passes each associated time code to the application software package via an asynchronous interface controller.

In another embodiment of the invention, the software package stores the pair of time-stamped packets and calculates the elapsed time at a later time.

In another aspect, the invention comprises system for time-stamping a data packet transmitted on or received from a data network. The system includes a network media interface device for accepting a receive data packet from, and providing a transmit data packet to, a network medium. The system also includes a time source for generating and maintaining a time code, and a time-stamping circuit. The time-stamping circuit samples a receive time code from the time source when the interface device accepts the receive data packet from the network medium, and associates the receive time code with the receive data packet so as to form a time-stamped receive packet. The time-stamping circuit also samples a transmit time code from the time source when the interface device provides the transmit data packet to the network medium, and associates the transmit time code with the transmit data packet, so as to form a time-stamped transmit packet.

In another aspect, the invention comprises a method of time-stamping a data packet associated with a data network. The method includes transferring a data packet to or from a network medium via a network media interface device, and generating and maintaining a time code in a time source. The method also includes sampling a time code from the time source when the interface device transfers the data packet to or from the network medium, and associating the time code with the receive data packet so as to form a time-stamped packet.

Another embodiment of the invention further includes storing the time-stamped packet in a memory circuit.

Another embodiment of the invention further includes receiving the time-stamped packet from the time stamping-circuit, and calculating an elapsed time therefrom.

Another embodiment of the invention further includes designating one or more specific packets via a registration module, and processing only those specific packets of all the packets received from the time-stamping circuit.

Another embodiment of the invention further includes designating one or more specific packets, and time-stamping only those specific packets of all the data packets transferred to or from the network.

Another embodiment of the invention further includes inserting at least a portion of the time code in a CRC field of the time-stamped packet.

Another embodiment of the invention further includes executing a CRC calculation on the packet so as to produce a single error bit signifying whether or not an error is present in the packet. The method also includes removing an original CRC word from the CRC field of the packet, and inserting the error bit and the time code into the CRC field of the packet.

Another embodiment of the invention further includes passing the packet to an application software package via a media access controller.

Another embodiment of the invention further includes passing the packet to an application software package via a media access controller, and passing the associated time code to the application software package via an asynchronous interface controller.

Another embodiment of the invention further includes storing the time-stamped receive packet and the time-stamped transmit packet, and calculating the elapsed time at a later time.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

The present invention, a system for hardware time stamping and registration of packetized data, substantially eliminates the aforementioned uncertainties introduced by software time stamping schemes. The invention allows highly accurate measurements of network transit times for packetized data. The invention associates a distinct time code (also referred to herein as "time-stamp") that designates a chronological reference point with each packet received from or provided to the physical media. The time code association is performed by hardware to minimize non-deterministic delays and other uncertainties associated with handling packets in software. In general, the time code that is associated with a packet is correlated to when a specific, predetermined point on the packet is at a particular location in the system. For example, in one embodiment, the time code may be correlated to when the beginning of the first bit of the packet is received from the physical media. In another embodiment, the time code may be correlated to the end of the last bit of the packet received from the physical media.

The time source (i.e., the source of the time code) may be any type of chronometer known in the art. In one embodiment, the time source is a simple free running counter running from a relatively stable local oscillator. In another embodiment, the time source may include a GPS based time source that is disciplined to UTC (Universal Time). An advantage of a GPS based time source is that several remote network stations can all be synchronized to within the dissemination error of the GPS system.

Each packet that is received from or provided to the physical network will have a unique time-stamp associated with it. A software process that has non-deterministic delays can process these hardware time-stamped packets in the future, on a non-real time basis, without losing precise arrival-time or transmit-time information, since each packet is associated with its own distinct time-stamp value.

Figure 2:
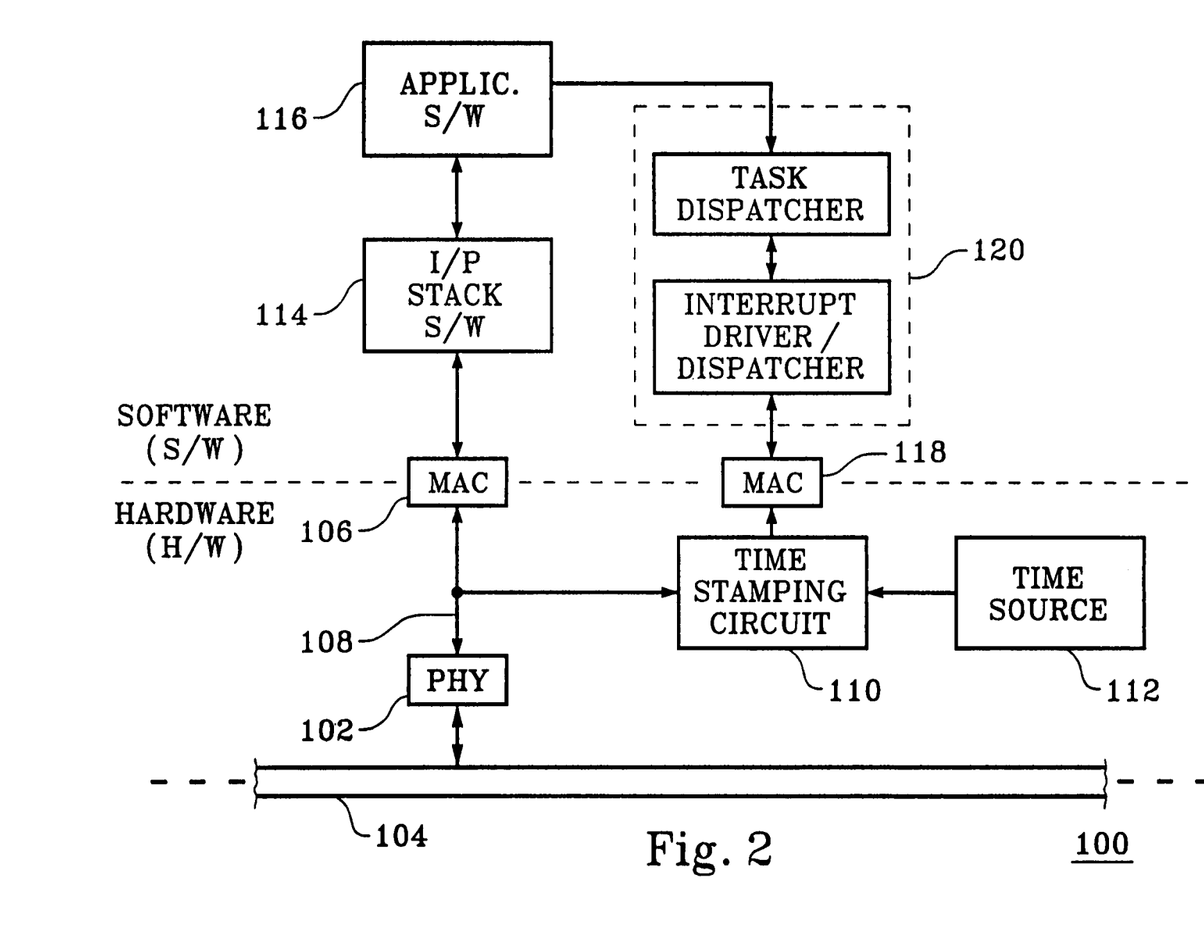
FIG. 2 shows a block diagram of one embodiment of a system for time stamping a data packet associated with a data network according to the present invention.

One embodiment of a system for time stamping a data packet associated with a data network 100 is shown in block diagram form in FIG. 2. The system 100 includes a network media interface device 102 (also referred to herein as "physical interface" or "PHY") coupled to a network medium 104 so as to facilitate packet transfer between the interface device 102 and the network medium 104. The media interface device 102 is also coupled to a media interface controller 106 (also referred to herein as "MAC") via a bi-directional interface 108. The MAC 106 provides, via the bi-directional interface 108, outgoing packets to the media interface device 102 that are to be sent out on the medium 104. The MAC 106 also receives, via the bi-directional interface 108, incoming packets from the media interface device 102 that have been received from the network medium 104. The system 100 further includes a time-stamping circuit 110 that receives any packets, incoming or outgoing, that propagate via the bi-directional interface 108 between the MAC 106 and the media interface device 102. Each time the time-stamping circuit 110 receives a packet from the interface 108, the time-stamping circuit 110 samples the time source 112 to acquire a time code, and associates that time code with the packet. The packet, together with the associated time code, are referred to herein collectively as a "time-stamped packet."

The temporal relationship between when the time-stamping circuit 110 receives a particular packet from the interface 108 and when the time-stamping circuit 110 samples the time source 112 is critical. In some embodiments of the invention, the time code that the time-stamping circuit 110 associates with a particular packet represents the exact state of the time source 112 when the packet is propagating across the interface 108. In other embodiments, the time code that the time-stamping circuit 110 associates with a particular packet may be a fixed offset from the exact state of the time source 112 when the packet is propagating across the interface 108. In any case, the time code associated with the packet in the time-stamping circuit 110 has a fixed temporal relationship with the state of the time source 112 when the packet as on the interface 108.

In one embodiment, the system 100 further includes an I/P stack 114, which is characterized by one or more software processes that handle various processing layers inherent in the packet data structure. The system 100 also includes an application software package 116 that handles the end-product of the packet communication. For example, the application software 116 may include a test application that generates the aforementioned "ping" messages, and calculates transit delays from the time codes associated therewith. For an outgoing message, the application software 116 generates the outgoing message and passes it to the I/P stack 114. The I/P stack receives the outgoing message, uses it to compile an outgoing packet, and passes the outgoing packet to the MAC 106. For an incoming message, the I/P stack 114 receives an incoming packet from the MAC 106, de-compiles it to access the layer that carries the incoming message, and passes the incoming message to the application software 116.

The time-stamping circuit 110 passes time-stamped packets to the application software 116 via a time-stamp MAC 118 and a dispatcher software process 120. In an embodiment of the invention that is particularly suitable for Ethernet based networks, the time-stamping circuit 110 combines the associated time-code and a CRC (cyclic redundancy code) word from the packet, and places the combination in the original CRC field to form a time-stamped packet. Ethernet packets propagate on the network medium 104 with a potentially small Inter Packet Gap (hereinafter referred to as "IPG") between each packet, depending on the packet rate. Such a small IPG makes appending a time code to these packets "on the fly" (i.e., in real time) difficult for two reasons. First, since a minimum IPG is required for proper operation of an Ethernet MAC, "stealing" any portion of the IPG for a time-stamp necessarily reduces the maximum data rate of the Ethernet channel. The Ethernet MAC is shown as the time-stamp MAC 118 in FIG. 2, although in general, the time-stamp MAC 118 may handle alternative communications protocols in other embodiments. Second, appending a time stamp to the end of an Ethernet packet will cause the Ethernet MAC to reject the packet, since the time-stamped packet will not appear to contain the proper CRC. Ethernet packets include a 32-bit CRC field, which are always placed in the last 4 bytes of the packet. If a time code is appended to the end of an Ethernet packet, the MAC will treat the last 4 bytes of this time code as the CRC field, which will in most instances produce an error indication from the CRC calculation.

In this embodiment of the invention, the time-stamping circuit 110 uses the CRC field of a packet to transport the time-code. For each received packet, the time-stamping circuit 110 validates the CRC of the packet and indicates any errors via a single status bit. Methods of validating the packet CRC are well known in the art, and are not described herein. The time-stamping circuit combines the status bit and the time code and inserts them into the original CRC field of the packet. In one embodiment, the status bit is pre-pended to the time stamp value, although the status bit may be included in any predetermined position within the CRC field. The system 100 configures the Ethernet MAC to receive the packet from the time-stamping circuit 110 without performing a CRC validation check. This will allow the Ethernet MAC 118 to store the packets with the time-code intact in its packet buffer memory. A software process referred herein to as the "dispatcher" 120 receives the time-stamped packet from the Ethernet MAC 118. The MAC 118 checks the CRC status bit and invalidates the packet if the status bit indicates an error.

The dispatcher 120 includes an interrupt-driven dispatcher 122, and a task dispatcher 124. Each time the time-stamp MAC 118 has a time-stamped packet available for the interrupt-driven dispatcher 122, the time-stamp MAC 118 issues an interrupt to the associated processor, and the processor vectors to the interrupt-driven dispatcher 122. The interrupt-driven dispatcher fetches the time-stamped packet from the MAC 118, and routes the packet to the task dispatcher 124.

The task dispatcher 124 receives registration information from a registration software module in the application software 116 that identifies and designates particular packets. The task dispatcher 122 compares the time-stamped packet to the registration information; if the time-stamped packet matches any of the packets listed in the registration information, the task dispatcher passes that time-stamped packet on to the application software 116. The comparison that the task dispatcher 122 performs may include a bit-wise comparison of selected fields in the packet. Alternately, the comparison may include a bit-wise comparison of only particular bits in the packet, or it may include a bit-wise comparison of all bits in the packet.

Figure 3:
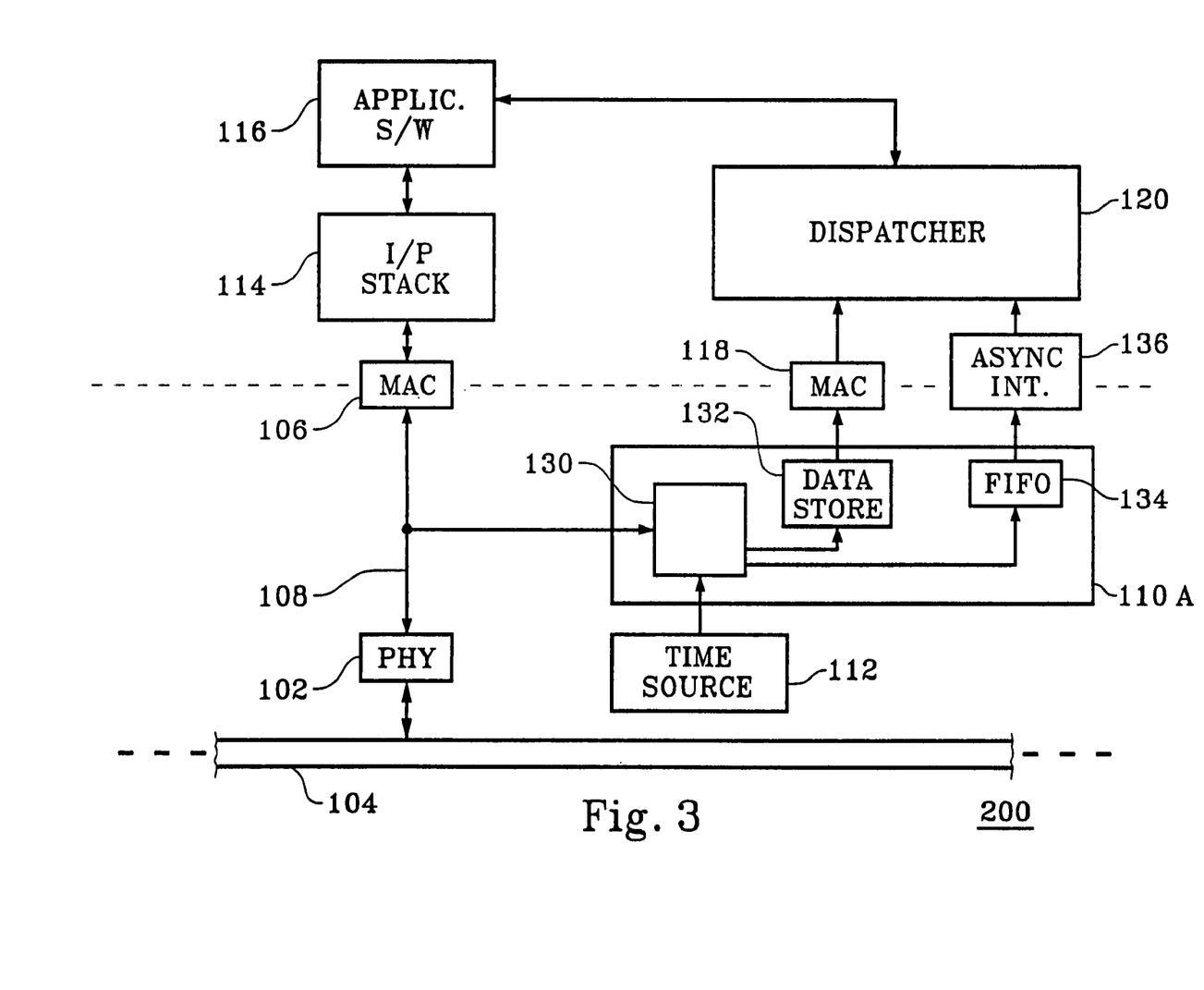
FIG. 3 shows another embodiment of the system shown in FIG. 2.

In another embodiment, the time-stamping circuit 110 may provide the time-stamped packet to the application software 116 by separately transferring the time-code and the associated packet across distinct channels, as shown in FIG. 3. The time-stamp circuit 110A in this embodiment includes the primary time-stamping circuitry 130, a data store 132 and a FIFO 134. For each packet the time-stamp circuit 110A receives from the bi-directional interface 108, the circuitry 130 samples the time-source 112 for a time-code and associates the time code with the packet, as described herein. The circuitry 130 then provides the packet to the data store 132 and provides the associated time code to the FIFO. 134. The dispatcher 120 then accesses the data store 132 and the FIFO 134 in lock-step (i.e., synchronized), so that the associated packets and time-codes are taken together. The dispatcher 120 receives the packets from the time-stamp MAC 118 via an interrupt-driven dispatcher, as described herein. The dispatcher 120 receives the associated time-code via an asynchronous interface device 136. Although the dispatcher 120 does not need to remove the associated time code at the same time that it removes the packet, dispatcher 120 must remove the associated time-code from the FIFO prior to removing another packet in order to remain in lock-step.

In a preferred embodiment, the time code that the time source 112 maintains includes a 64 bit word, with the least significant bit corresponding to 1 nS. Time-codes having other lengths may be used in alternative embodiments to provide different time resolutions; the 64 bit code described herein is merely an illustrative example. One disadvantage to the embodiment shown in FIG. 2 is that only the 31 least significant bits (low order bits) of the time code can be combined with the status bit and sent across the MAC 118 in the CRC field of the packet. This embodiment copes with such a truncation by maintaining an mirror version of the most significant 33 bits (high order bits) of the time code in the dispatcher 120, and monitoring the low order bits in the consecutive time-stamped packets for roll-over as they reach the dispatcher 120. When the low order bits in consecutive packets transition from a large value to a small value, roll-over is indicated. Further, the dispatcher 120 may periodically poll the time source 112 to maintain synchronization between the two sets of high order bits. The embodiment shown in FIG. 3 circumvents the time-code truncation issue by utilizing a 64 bit FIFO 134, and passing the entire 64 bit word to the dispatcher 120 via the asynchronous interface 136.

As described herein for the prior art, the system 100 can calculate packet transit delay on the network medium 104 by performing a ping test with a second station, time-stamping the transmitted echo request and the received echo response packet, then calculating the difference between the time-stamps. However, since the echo request and echo response packets must pass through an I/P stack at the second station (i.e., the station that "loops back" the message), some amount of uncertainty in the calculation of the packet transit delay still remains. The system 100 reduces the uncertainty by performing the hardware time-stamping as described herein.

Figure 4:
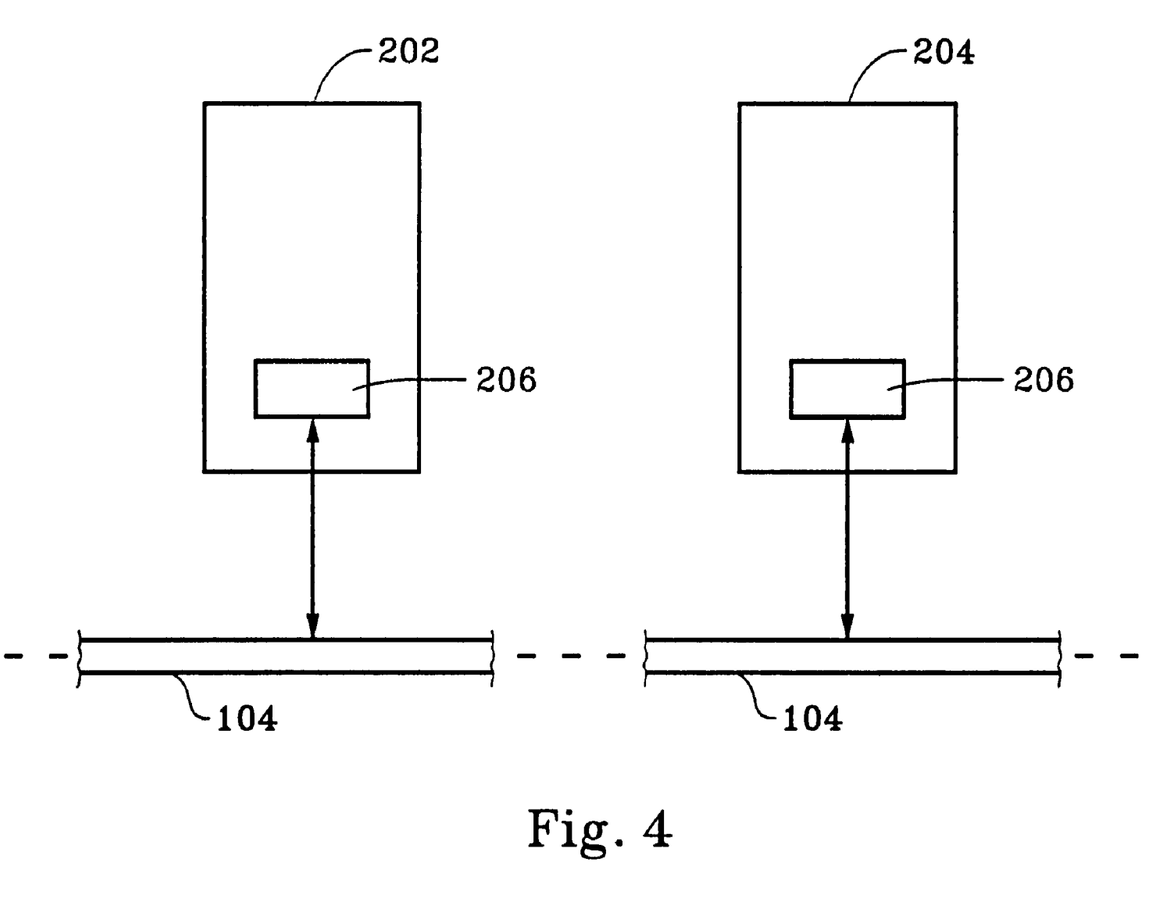
FIG. 4 shows an embodiment of the invention shown in FIG. 2 that further removes transit delay ambiguity.

Nearly all such uncertainty can be removed from the calculation of the packet transit delay by placing a hardware time stamping system as described herein at both ends of the network medium to be tested, and by executing a special set of test packets. One such embodiment is shown in FIG. 4. This embodiment includes a first station 202 and a second station 204 both connected to a network medium 104. Each station includes a system 206 for time stamping a data packet associated with a data network. The system 206 may include the embodiment described in either FIG. 2 or FIG. 3. In one embodiment, the sequence of events for calculating packet transit delay is as follows:

(1) The first station 202 initiates the calculation by sending a first test packet characterized by a first predetermined identification (ID) code to the second station.
(2) The first station 202 time-stamps the first test packet as it is transmitted to the medium 104.
(3) The second station 204 time-stamps the first test packet when the second station 204 receives the first test packet from the medium 104.
(4) The first test station 202 sends a second test packet (characterized by a second predetermined ID code) to the second station 204. This second test packet contains the time-code that was associated with the first test packet at the first station 202.

After receiving the first and second test packets, the second station 204 has the time-code that was associated with the first test packet at the first station (via the second test packet), and the time-code that was associated with the first test packet at the second station 204 (via the time-stamping at the second station). Both time-codes were generated via hardware time-stamping circuit as described herein, thus eliminating software-induced uncertainty. In this embodiment, the time source associated with the first station 202 and the time source associated with the second station 204 are synchronized in some manner, e.g., via GPS or other synchronization method known in the art. Finally, (5) The second test station 204 calculates the difference between the time-code that was associated with the first test packet at the first station and the time-code that was associated with the first test packet at the second station 204 to determine the packet transit delay.

An additional advantage of determining the packet transit delay by time-stamping a packet at two network stations is that one-way packet transit time may be accurately calculated. In prior art systems that determine the "round trip" transit time of the packet, the one way transit time may be estimated by assuming a symmetrical network and dividing the round-trip time in half. However, many networks are not symmetrical, so simply dividing the round-trip time in half may be inaccurate.

The present invention may be used for measurement and delay analysis for communication products that use the Internet or other large networks to exchange information. The objective is to remove inaccuracies associated with the network interface software stack and more accurately measure the network infrastructure delay and performance.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A system for time-stamping a data packet associated with a data network, comprising:
    a network media interface device for transferring an IP packet to or from a network medium;
    a time source for generating and maintaining a time code;
    a time stamping circuit for sampling a time code from the time source when the interface device transfers the IP packet to the network medium from a software layer or from the network medium to the software layer, and for associating the time code with the IP packet so as to form a time stamped IP packet;
    an application software package for receiving a pair of time-stamped IP packets from the time stamping circuit, and for calculating a time difference therefrom;
    wherein each of the time-stamped IP packets includes at least a portion of the time code in a CRC field of the IP packet; and
    wherein for each of the time-stamped IP packets, the time-stamping circuit (i) executes a CRC calculation on the IP packet so as to produce a single error bit signifying whether or not an error is present in the IP packet, (ii) removes as an original CRC word from the CRC field of the IP packet, and (iii) inserts the error bit and the time code into the CRC field of the IP packet.

2. A system according to claim 1, wherein the time-stamping circuit further includes a memory circuit for storing the time-stamped IP packet.

3. A system according to claim 1, wherein the network media interface device includes an Ethernet interface device for implementing an Ethernet protocol on the network media.

4. A system according to claim 1, the application software package further including a registration module for designating one or more specific IP packets, wherein the software package receives the IP packet designations from the registration module, and processes only those specific IP packets of all the IP packets received from the time-stamping circuit.

5. A system according to claim 1, the application software package further including a registration module for designating one or more specific IP packets, wherein the time-stamping circuit receives the IP packet designations from the registration module, and time-stamps only those specific IP packets of all the IP packets transferred to or from the network.

6. A system according to claim 1, wherein the time-stamping circuit passes each IP packet to the application software package via a media access controller.

7. A system according to claim 1, wherein the time stamping circuit passes each IP packet to the application software package via a media access controller, and passes each associated time code to the application software package via an asynchronous interface controller.

8. A system according to claim 1, wherein the software package stores the pair of time-stamped IP packets and calculates the elapsed time at a later time.

9. A system for time-stamping a data packet transmitted on or received from a data network, comprising:
    a network media interface device for accepting a receive IP packet from, and providing a transmit IP packet to, a network medium;
    a time source for generating and maintaining a time code;
    a time-stamping circuit for (i) sampling a receive time code from the time source when the interface device accepts the receive IP packet from the network medium, and associating the receive time code with the receive IP packet so as to form a time-stamped receive packet prior to transferring the receive packet to a software layer, and (ii) sampling a transmit time code from the time source when the interface device provides the transmit IP packet from the software layer to the network medium, and associating the transmit time code with the transmit IP packet, so as to form a time stamped IP packet;
    an application software package for receiving the time-stamped receive IP packet and the time-stamped IP transmit packet from the time stamping-circuit, and for calculating a time difference therefrom;
    wherein the time-stamped transmit packet and the time-stamped receive packet include at least a portion of the time code in a CRC field of the packet; and
    wherein the time-stamping circuit (i) executes a CRC calculation on the IP packet so as to produce a single error bit signifying whether or not an error is present in the IP packet, (ii) removes as an original CRC word from the CRC field of the IP packet, and (iii) inserts the error bit and the time code into the CRC field of the IP packet.

10. A system according to claim 9, wherein the time-stamping circuit further includes a memory circuit for storing the time-stamped receive IP packet, and for storing the time-stamped transmit IP packet.

11. A system according to claim 9, wherein the network media interface device includes an Ethernet interface device for implementing an Ethernet protocol on the network media.

12. A system according to claim 9, the application software package further including a registration module for designating one or more specific IP packets, wherein the software package receives the specific IP packet designations from the registration module, and processes only those specific IP packets of all the IP packets from the time-stamping circuit.

13. A system according to claim 9, the application software package further including a registration module for designating one or more specific IP packets, wherein the time-stamping circuit receives the specific IP packet designations from the registration module, and time-stamps only those specific IP packets of all the receive IP packets and the transmit IP packets.

14. A system according to claim 9, wherein the time-stamping circuit passes the IP packet to the application software package via a media access controller.

15. A system according to claim 9, wherein the time stamping circuit passes the IP packet to the application software package via a media access controller, and passes the associated time code to the application software package via an asynchronous interface controller.

16. A system according to claim 9, wherein the software package stores the time-stamped receive IP packet and the time-stamped transmit packet and calculates the elapsed time at a later time.

17. A method of time-stamping a data packet associated with a data network, comprising:
    transferring an IP packet to a network medium from a software layer or from the network medium to the software layer via a network media interface driver;
    generating and maintaining a time code in a time source;
    sampling, via time-stamping circuit, a time code from the time source when the interface device transfers the IP packet to or from the network medium, and associating the time code with the receive IP packet so as to form a time-stamped packet;
    receiving the time-stamped IP packet from the time stamping-circuit, and calculating an elapsed time therefrom;
    inserting at least a portion of the time code in a CRC field of the time-stamped packet; and
    (i) executing a CRC calculation on the IP packet so as to produce a single error bit signifying whether or not an error is present in the IP packet, (ii) removing as an original CRC word from the CRC field of the IP packet, and (iii) inserting the error bit and the time code into the CRC field of the IP packet.

18. A method according to claim 17, further including storing the time-stamped IP packet in a memory circuit.

19. A method according to claim 17, further including designating one or more specific IP packets via a registration module, and processing only those specific IP packets of all the IP packets received from the time-stamping circuit.

20. A method according to claim 17, further including designating one or more specific IP packets, and time-stamping only those specific IP packets of all the IP packets transferred to or from the network.

21. A method according to claim 17, further including passing the IP packet to an application software package via a media access controller.

22. A method according to claim 17, further including passing the IP packet to an application software package via a media access controller, and passing the associated time code to the application software package via an asynchronous interface controller.

23. A method according to claim 17, further including storing the time-stamped receive IP packet and the time-stamped transmit IP packet, and calculating the elapsed time at a later time.

24. A method of time-stamping a data packet with a time code and transferring the packet and time code without changing the size of the packet, comprising:
    sampling the time code from a time source and associating the time code with an IP packet when the IP packet transfers between a network medium and a software layer;
    combining an original CRC word from a CRC field of the IP packet with the time code so as to form a modified time code, and inserting the modified time code into the CRC field, wherein combining the CRC with the time code includes:
        executing a CRC calculation on the IP packet so as to produce a single error bit signifying whether or not an error is present in the IP packet;
        removing the original CRC word from a CRC field of the IP packet, and
        concatenating the error bit and at least a portion of the time code so as to form the modified time code, and inserting the modified time code into the CRC field of the packet.

25. A system for time-stamping a data packet associated with a data network, comprising:
    a network media interface device for transferring a data packet to or from a network medium;
    a time source for generating and maintaining a time code;
    a time-stamping circuit for sampling a time code from the time source when the interface device transfers the data packet to or from the network medium, and for associating the time code with the data packet so as to form a time-stamped packet;
    an application software package for receiving a pair of time-stamped packets from the time stamping-circuit, and for calculating a time difference therefrom;
    wherein each of the time-stamped IP packets includes at least a portion of the time code in a CRC field of the IP packet; and
    wherein for each of the time-stamped IP packets, the time-stamping circuit (i) executes a CRC calculation on the IP packet so as to produce a single error bit signifying whether or not an error is present in the IP packet, (ii) removes an original CRC word from the CRC field of the IP packet, and (iii) inserts the error bit and the time code into the CRC field of the IP packet.

26. A system for time-stamping a data packet transmitted on or received from a data network, comprising:
    a network media interface device for accepting a receive data packet from, and providing a transmit data packet to, a network medium;
    a time source for generating and maintaining a time code;
    a time-stamping circuit for (i) sampling a receive time code from the time source when the interface device accepts the receive data packet from the network medium, and associating the receive time code with the receive data packet so as to form a time-stamped receive packet, and (ii) sampling a transmit time code from the time source when the interface device provides the transmit data packet to the network medium, and associating the transmit time code with the transmit data packet, so as to form a time-stamped transmit packet;

an application software package for receiving the time-stamped receive packet and the time-stamped transmit packet from the time stamping-circuit, and for calculating a time difference therefrom;

wherein the time-stamped transmit packet and the time-stamped receive packet include at least a portion of the time code in the CRC field of the packet; and wherein the time-stamping circuit (i) executes a CRC calculation on the packet so as to produce a single error bit signifying whether or not an error is present in the packet, (ii) removes an original CRC word from the CRC field of the packet, and (iii) inserts the error bit and the time code into the CRC field of the packet.

27. A method of time-stamping a data packet associated with a data network, comprising:

transferring a data packet to or from a network medium via a network media interface device;

generating and maintaining a time code in a time source;

sampling, via time-stamping circuit, a time code from the time source when the interface device transfers the data packet to or from the network medium, and associating the time code with the receive data packet so as to form a time-stamped packet;

receiving the time-stamped IP packet from the time stamping-circuit, and calculating an elapsed time therefrom;

inserting at least a portion of the time code in a CRC field of the time-stamped packet; and (i) executing a CRC calculation on the packet so as to provide a single error bit signifying whether or not an error is present in the packet, (ii) removing an original CRC word from the CRC field of the packet, and (iii) inserting the error bit and the time code into the CRC field of the packet.

28. A method of time-stamping a data packet with a time code and transferring the packet and time code without changing the size of the packet, comprising:

sampling the time code from a time source and associating the time code with the packet; and combining an original CRC word from a CRC field of the packet with the time code so as to form a modified time code, and inserting the modified time code into the CRC field, wherein combining the CRC with the time code includes, executing a CRC calculation on the packet so as to produce a single error bit signifying whether or not an error is present in the packet.

removing the original CRC word from the CRC field of the packet, and concatenating the error bit and at least a portion of the time code so as to form the modified time code, and inserting the modified time code into the CRC field of the packet.

* * * * *